United States Patent [19]
Wuidart et al.

[11] Patent Number: 5,798,914
[45] Date of Patent: Aug. 25, 1998

[54] POWER FACTOR OF A RECTIFIED POWER SUPPLY

[75] Inventors: Luc Wuidart, Pourrieres; Alain Bailly, Simiane, both of France

[73] Assignee: SGS-Thomson Microelectronics S.A., Saint Genis, France

[21] Appl. No.: 641,618

[22] Filed: May 1, 1996

[30] Foreign Application Priority Data

May 9, 1995 [FR] France ..................... 95 05686
Oct. 16, 1995 [FR] France ..................... 95 12309

[51] Int. Cl.⁶ ........................................... H02M 1/14
[52] U.S. Cl. ........................ 363/44; 363/39; 363/45
[58] Field of Search .......................... 363/39, 44, 45, 363/46, 60, 61, 62; 323/282, 284, 288, 299

[56] References Cited

U.S. PATENT DOCUMENTS

| | | | |
|---|---|---|---|
| 4,622,474 | 11/1986 | Christl et al. ............... | 363/44 X |
| 4,864,484 | 9/1989 | Krueger et al. ............. | 363/45 |
| 5,014,177 | 5/1991 | Nuechterlein ............... | 363/45 |
| 5,402,331 | 3/1995 | Takahashi et al. .......... | 363/44 X |

FOREIGN PATENT DOCUMENTS

| | | | |
|---|---|---|---|
| A-0 600 340 | 6/1994 | European Pat. Off. ....... | H05B 41/29 |
| 2 226 197 | 12/1973 | Germany ..................... | H02M 1/12 |
| A-44 26 258 | 2/1995 | Germany ..................... | H02M 3/07 |
| A-195 06 587 | 8/1995 | Germany ..................... | H02M 1/12 |
| A-61-173322 | 5/1986 | Japan ........................... | G05F 1/56 |

OTHER PUBLICATIONS

IECON '94, Sep. 5, 1994 Aintablian "A New Single Phase Ac to DC Harmonic Reduction Converter Based on the Voltage Doubler Circuit", pp. 452–457.

*Primary Examiner*—Peter S. Wong
*Assistant Examiner*—Y. J. Han
*Attorney, Agent, or Firm*—Wolf, Greenfield & Sacks, P.C.; James H. Morris

[57] ABSTRACT

The present invention relates to a device for improving the harmonic ratio sent back onto the mains in a rectified power supply including a rectifying bridge and at least one capacitor connected to a first output terminal of the rectifying bridge. Between the second terminal of the capacitor and a second output terminal, a first charge path including a resistor is provided, as well as a second switchable discharge path, associated with means for switching on the discharge path only after the supply voltage has transmitted through a maximum.

33 Claims, 12 Drawing Sheets

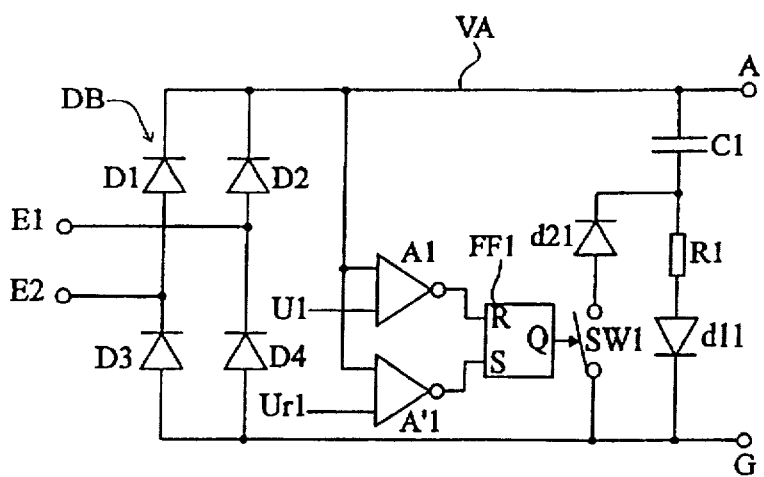
Fig 3
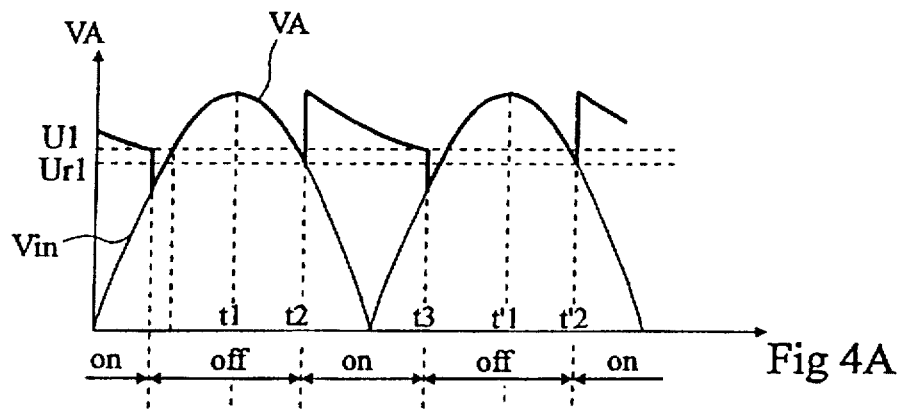
Fig 4A
Fig 4B
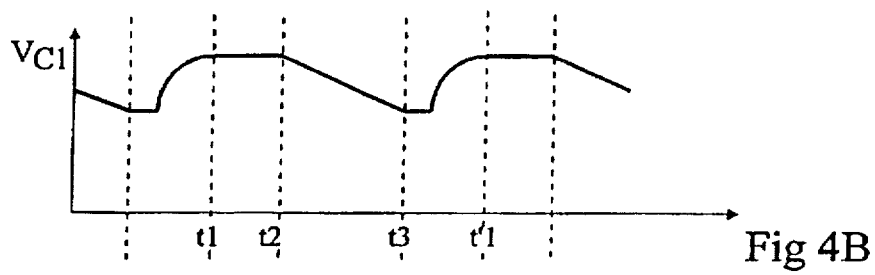
Fig 4C
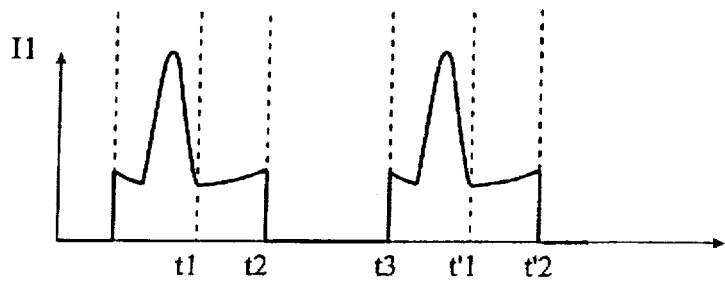
Fig 4D

POWER FACTOR OF A RECTIFIED POWER SUPPLY

BACKGROUND OF THE INVENTION

1. Field of the Invention

This invention relates to the field of rectified power supplies obtained from an a.c. voltage, for example the a.c. supply voltage, and especially to power supplies serving as a basis of a switching power supply system.

2. Discussion of the Related Art

FIG. 1A shows the simplest schematic of a conventional rectifier. This rectifier includes a diode bridge DB including four rectifying diodes D1 to D4, a first diagonal of which is connected to terminals E1 and E2 of an a.c. supply line, and the other diagonal of which is connected to terminals A and G of a rectified d.c. power supply. Terminal G generally is a ground terminal. A storage capacitor C is installed between terminals A and G. Behind terminals A and G, a switching power supply system, for example, is provided.

FIG. 1B shows the shape of voltage V and current I between terminals A and G of the rectifying bridge.

In the absence of capacitor C, the voltage between terminals A and G would consist in the rectified sine waves of the mains.

From a time $t_1$ corresponding to the maximum of a sine wave, capacitor C is substantially entirely charged, then discharged to supply a circuit located between terminals A and G. At a time $t_2$, the rectified supply voltage becomes higher than the terminal voltage of the capacitor. Then, during a brief time period, comprised between times $t_2$ and $t_3$, the mains voltage recharges the capacitor by supplying a current pulse I. Thus, such a supply circuit pumps out from the mains relatively brief current pulses in the vicinity of the maximum supply voltage. Fourier's theories teach us that the shorter a pulse, the broader its frequency spectrum. Thus, as a result, a great number of harmonics are created on the mains between terminals E1 and E2. This is a nuisance to the operation of a network.

These harmonics are intended to be reduced, that is, in simple language, current pulse I is intended to be broadened.

For this purpose, so-called power factor compensation circuits are known, such as the one illustrated in FIG. 2 wherein the series connection of an inductance L and a diode D has been inserted between one terminal of the rectifying bridge and terminal A. The junction between inductance L and diode D is connected to terminal G via a controlled switch SW. A processor-type circuit P adequately controls switch SW according to the detected voltage and current. Such a circuit, available, for instance, from, SGS-Thomson Micro electronics under reference number L6560 provides a next to perfect correction of the power factor, that is, current I takes the shape of a sine wave in phase with the voltage sine wave.

A major drawback of a power factor compensating circuit is its cost, since it includes, on the one hand, components which can be used in the form of semiconductors, such as the processor, the switch and the diode, and, on the other hand, an inductance which always remains an expensive and sometimes fragile component.

Circuits without an inductance have also been disclosed, for example in Japanese patent application 61/173322, in which the discharge of the storing capacitor is delayed. However, these circuits do not provide in practice a sufficient broadening of the current pulses extracted from the mains.

SUMMARY OF THE INVENTION

Thus, an object of the present invention is to provide a method and a device for improving the harmonic ratio sent back onto the mains by a rectifying circuit.

To achieve this and other objects, the present invention provides a method for supplying a rectified supply voltage on at least one capacitor disposed on the rectified side of a rectifying bridge including:

providing a plurality of capacitors having progressively decreasing values, in series with resistors having equally decreasing values;

inhibiting a discharge of the capacitors during an initial decrease phase of an alternating current voltage applied to the rectifying bridge after each occurrence of a maximum;

the duration of inhibition of the capacitors of progressively decreasing values being increasing and, as soon as a capacitor enters a discharge phase, the previously discharging capacitor being blocked.

The present invention also provides a device for improving a harmonic ratio sent back onto a mains in a rectified power supply including a rectifying bridge, a plurality of capacitors having increasing values and increasing charge time constants, the first associated reference voltages being successively increasing, each capacitor having a first terminal connected to a first output terminal of the rectifying bridge, including, a first charge path including a resistor, between a second terminal of each capacitor and a second output terminal, and a second switchable discharge path, associated with control means to switch on the discharge path only after the supply voltage has transited through a maximum for improving the harmonic ratio sent back onto the mains in a rectified power supply including a rectifying bridge and at least one capacitor connected to a first output terminal of the rectifying bridge. Between the second terminal of the capacitor and a second output terminal, a first charge path including a resistor is provided, as well as a second switchable discharge path, associated with control means for switching on the discharge path only after the supply voltage has transited through (i. e., passed through) a maximum.

According to an embodiment of the present invention, the control means compare the voltage on the first terminal with first and second reference voltages.

According to an embodiment of the present invention, the control means compare the rectified supply voltage with first and second reference voltages.

According to an embodiment of the present invention, the first and second reference voltages are equal to one another.

According to an embodiment of the present invention, each charge path includes a resistor in series with a diode.

According to an embodiment of the present invention, each charge path includes a capacitor, a resistor, and a diode, and each discharge path includes a switch connected to the second supply terminal and to the second terminal of the rectifying bridge via a common diode.

According to an embodiment of the present invention, the switch of each discharge path is constituted by a thyristor having its gate connected in series to a Zener diode having its second terminal connected, for the first stage, to the anode of the corresponding thyristor and, for the other stages, to the junction of the resistor and the diode of the preceding stage.

According to an embodiment of the present invention, means for supplying a second rectified supply voltage, which is low with respect to the first rectified supply voltage and substantially corresponds to the potential on the second terminal of one of the capacitors, are provided.

According to an embodiment of the present invention, the voltage on said second terminal is supplied to a storage circuit including a diode in series with an auxiliary capacitor.

According to an embodiment of the present invention, means for regulating the voltage across the auxiliary capacitor are provided.

According to an embodiment of the present invention, the regulating means include a Shockley-type diode connected across the series connection including said diode and said auxiliary capacitor.

These objects, features and advantages, as well as others, of the present invention will be discussed in detail in the following description of specific embodiments, taken in conjunction with the following drawings, but not limited by them.

BRIEF DESCRIPTION OF THE DRAWINGS

FIG. 3 shows a power factor correcting circuit first embodiment with only one stage;

FIGS. 4A to 4D illustrate voltage and current waveshapes and logic signals appearing in the circuit of FIG. 3;

DETAILED DESCRIPTION

Figure 1A:
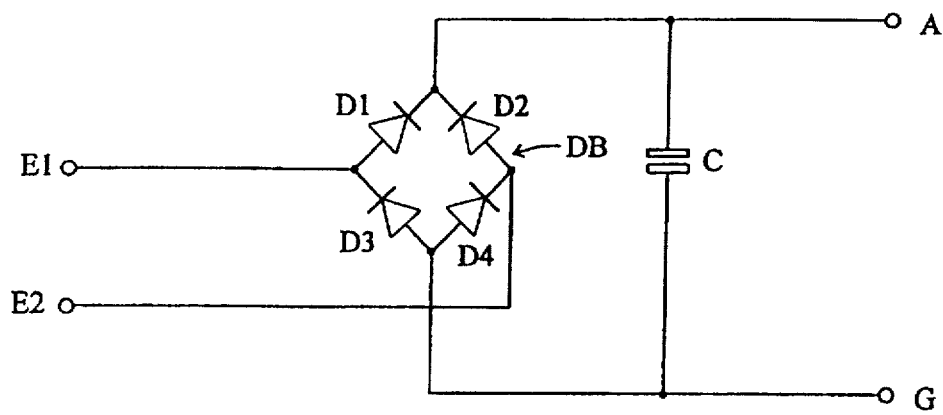
FIG. 1A schematically shows a prior art power supply rectifying device.
Figure 1B:
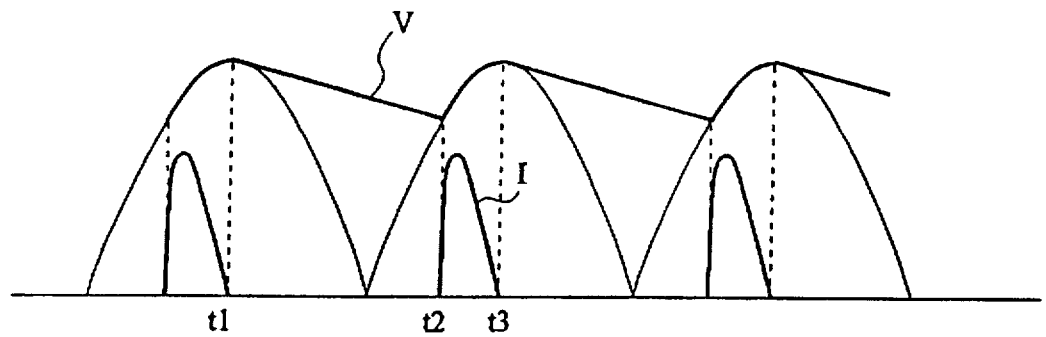
FIG. 1B shows voltage and current curves associated with the rectifying circuit of FIG. 1A.
Figure 2:
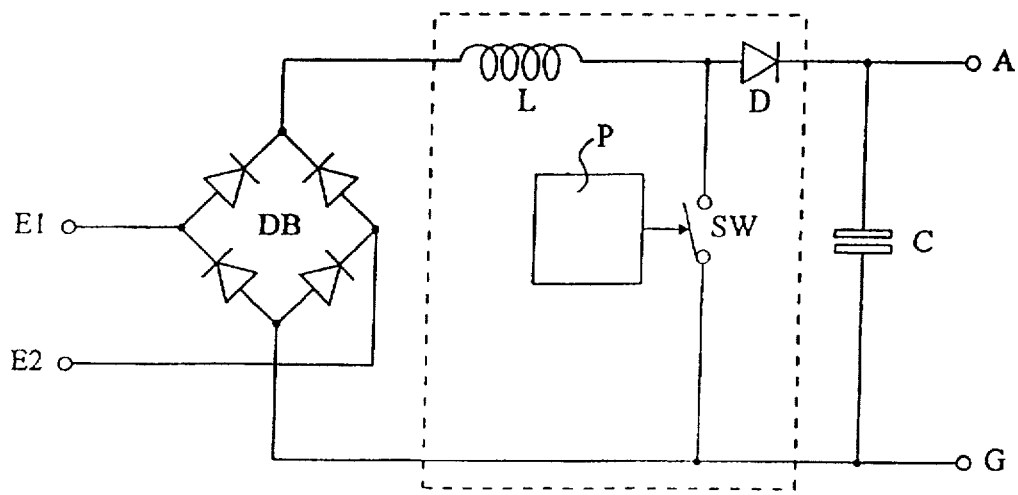
FIG. 2 shows a conventional power factor correcting circuit.

FIG. 3 illustrates an embodiment with only one stage of a power factor correcting circuit. A diode bridge DB including diodes D1 to D4 receives the supply voltage between terminals E1 and E2 and supplies a rectified voltage between terminals A and G. A storage capacitor C1 corresponding to capacitor C of FIG. 1 is connected by one of its terminals to terminal A and by its other terminal to terminal G via two paths in parallel. The first path includes a resistor R1 and a diode d11 biased to let current flow from terminal A to terminal G. The second path includes a controlled switch SW1 in series with a diode d21 biased to let current flow from terminal G to terminal A. Switch SW1 is controlled by the output Q of an RS flip-flop FF1, the input R of which receives the output of an inverting comparator A1 and the input S of which receives the output of an inverting comparator A'1. Comparators A1 and A'1 respectively compare voltage VA on terminal A with reference voltages U1 and Ur1.

It should be noted that the first path including resistors R1 and d11 is a charge path for capacitor C1 and the second path including diode d21 and switch SW1 is a discharge path for capacitor C1. As long as the second path is off, capacitor C1 cannot discharge to supply the circuit connected between terminals A and G. It is thus possible to keep on delivering the power supply between terminals A and G from the rectified supply voltage even after capacitor C1 has been completely charged and the mains voltage starts decreasing. The circuit has many advantages.

First, when capacitor C1 is next used to supply the circuit, this capacitor will be used for a shorter time to supply the circuit and will discharge itself less. The voltage between terminals A and G will thus be better smoothed (regulated) than in the case of the circuit of FIG. 1A.

Second, the provision of resistor R1 in series with capacitor C1 limits the steepness of the slope of the leading edge of the charge current.

In the third place, the width of the current extracted from the mains is increased.

The upper part of FIG. 4A shows voltage VA on terminal A. Near time $t_1$, switch SW1 is off and capacitor C1 can charge but cannot discharge. At a time $t_2$ when voltage VA becomes lower than reference voltage Ur1, switch SW1 is on and the full charge of capacitor C1 is found on terminal A again. Then, between times $t_2$ and $t_3$, the capacitor supplies the circuit and steadily discharges. At time $t_3$, voltage VA reaches reference voltage U1 and switch SW1 is off again. At that time, the voltage on terminal A drops to the value of the supply voltage, then rises again following the halfwave of the mains and the cycle is repeated from time $t'_1$.

FIG. 4B shows terminal voltage VC1 of capacitor C1. At time $t_1$, this voltage is at its maximum and remains substantially constant until time $t_2$ while the capacitor cannot discharge. Then, the capacitor steadily discharges between times $t_2$ and $t_3$, remains at a constant charge for a short time until the supply voltage has reached the value of the terminal voltage of the capacitor at time $t_3$, then recharges until time $t'_1$.

FIG. 4C shows the shape (rectified) of the current $I_1$ extracted from the mains during the various phases. Between times $t_1$ and $t_2$, the mains voltage supplies the circuit connected to terminals A and G and, if the power consumption between terminals A and G is assumed to be constant, while the supply voltage decreases, the current slightly increases to supply a constant power. Between times $t_2$ and $t_3$, no inrush current is needed from the mains since the current is supplied by capacitor C1. Then, from the time when the voltage has caught up on the terminal voltage of the capacitor, a current is extracted from the mains to supply the charge circuit and charge the capacitor. It should be noted that this current increases slower than the current illustrated in FIG. 1B because of the presence of resistor R1. Then, from time $t'_1$, the supply current of the circuit located between terminals A and G is found to come from the mains again until time $t'_2$.

Thus, as well shown in FIG. 4C, the mains, instead of supplying a short current pulse to the rectifying circuit, according to the invention, supplies a pulse including broadened flanks due to the direct supplying of the circuit between terminals A and G from the mains.

FIG. 4D shows the signals supplied to terminals R and S to control flip-flop FF1 and adequately obtain the on and off commands for switch SW1. Substantially at time $t_2$, signal S changes from 0 to 1 and the signal on terminal Q turns switch SW1 on. Substantially at time $t_3$, the switching of signal R makes output Q switch. At time $t'_2$, the switching of signal S from 0 to 1 will switch output Q again. The desired result is thus obtained by means of a simple control circuit including only two inverting amplifiers and a flip-flop. As a matter of fact, it should be noted that reference voltages U1 and Ur1 could be equal, which simplifies the control circuit.

However, the improvement resulting from the circuit of FIG. 3 is in practice insufficient. In order to improve the width of the current peak extracted from the mains, according to the invention, the multiplying of the number of stages of the circuit illustrated in FIG. 3 is provided.

Figure 5:
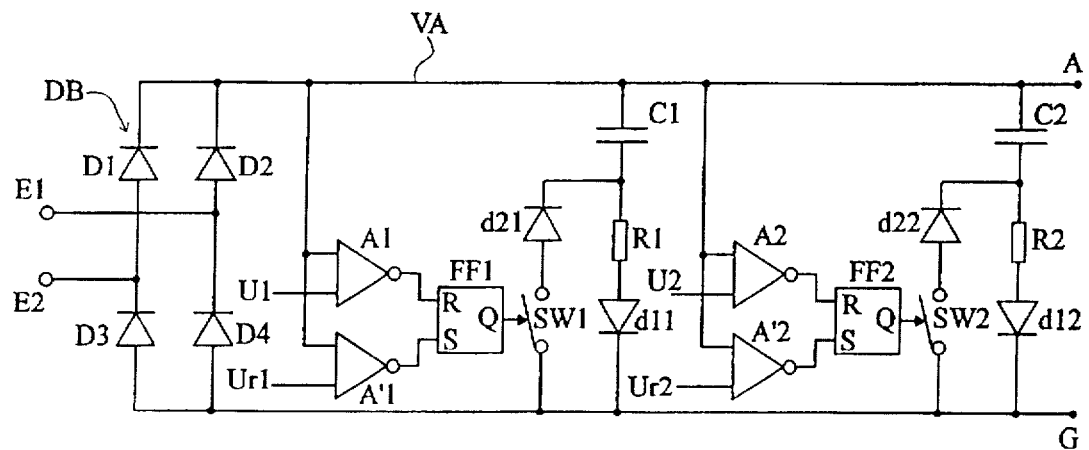
FIG. 5 shows a two-stage embodiment of a circuit according to the present invention.

In FIG. 5, the left part shows exactly the same elements as in FIG. 3, but a further identical stage has been added. The components of this second stage have the same reference numbers as the corresponding first stage components, but with the index 2 instead of the index 1. Second stage capacitor C2 has a higher value than first stage capacitor C1 and time constant R2*C2 is higher than time constant R2*C2. Preferably, R2 is higher than R1. Reference voltages Ur2 and U2 are respectively higher than or equal to voltages Ur1 and U1.

Figure 6:
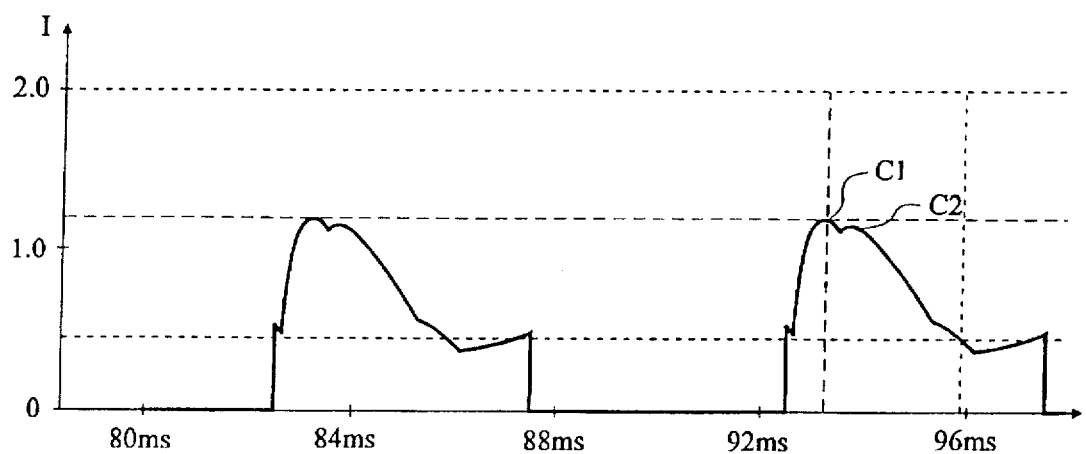
FIG. 6 shows the current waveshape obtained with the circuit of FIG. 5.

Thus, as shown in FIG. 6, a further broadening of the capacitor charge current peak is obtained. A first peak corresponds to the charge of capacitor C1 which charges very quickly with a relatively small time constant and a second wider and delayed peak corresponds to the charge of capacitor C2 which charges with a greater time constant.

A broadening of the current pulse extracted from the mains has thus been obtained to charge the capacitors, as desired, and the amplitude of the harmonics sent back onto the mains is thus reduced.

Figure 7:
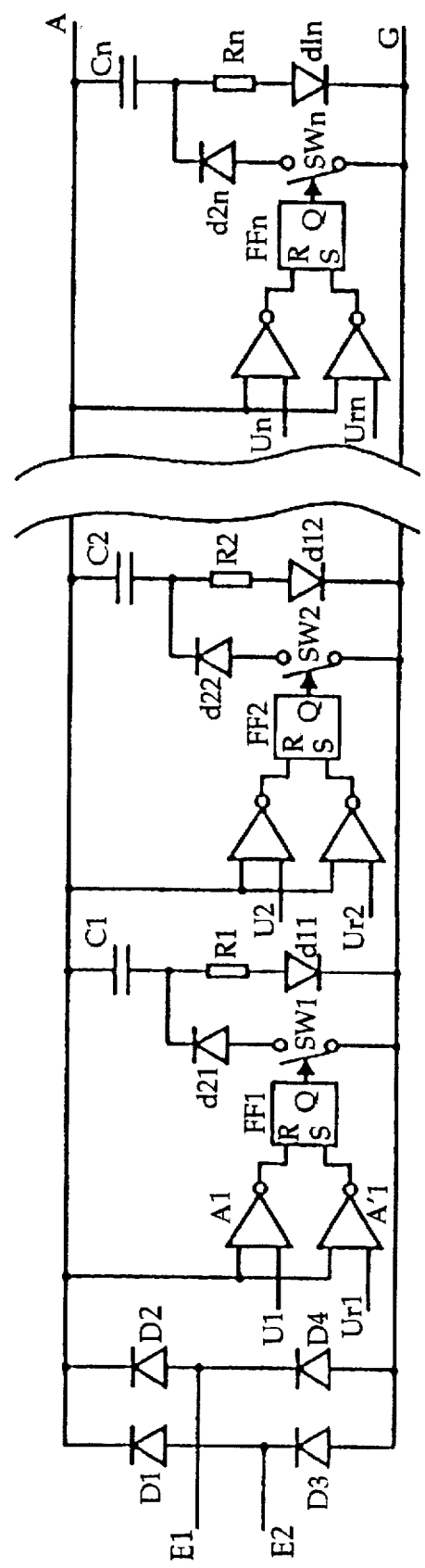
FIGS. 7 to 12 show various embodiments of circuits with several stages according to the present invention.

FIG. 7 shows an n-stage circuit, where each stage is similar to those previously described in conjunction with FIGS. 3 and 5.

Figure 8:
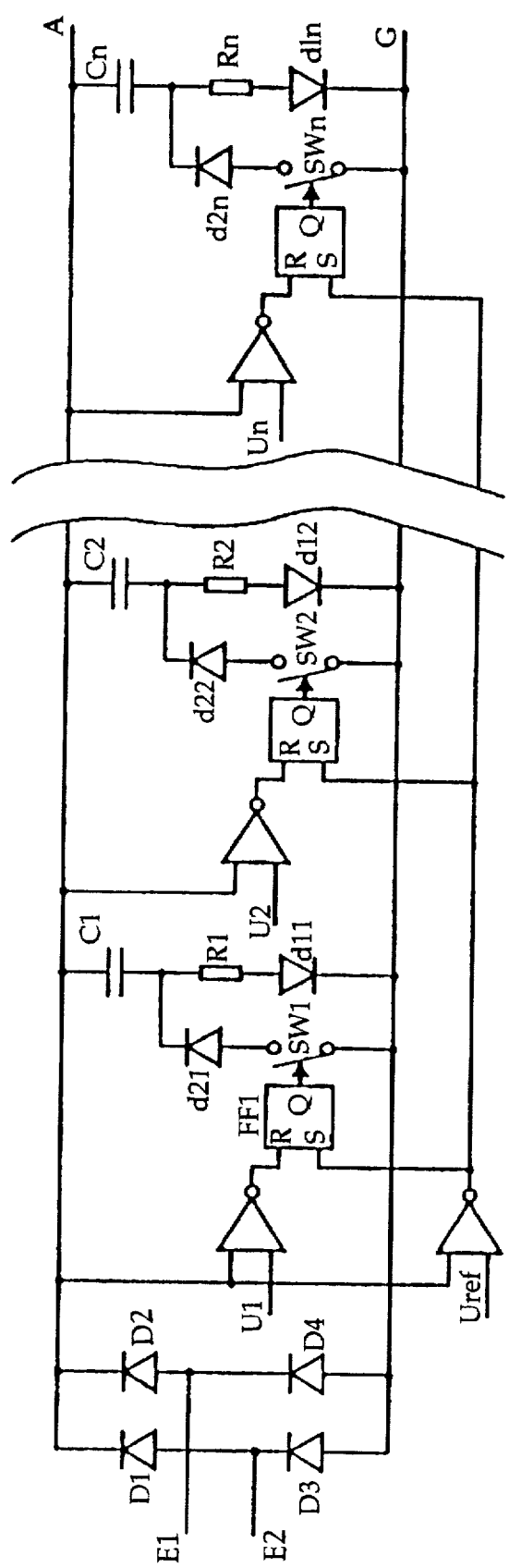

FIG. 8 shows a circuit substantially similar to that of FIG. 7, but wherein all voltages Uri are equal to a same voltage Uref.

Figure 9:
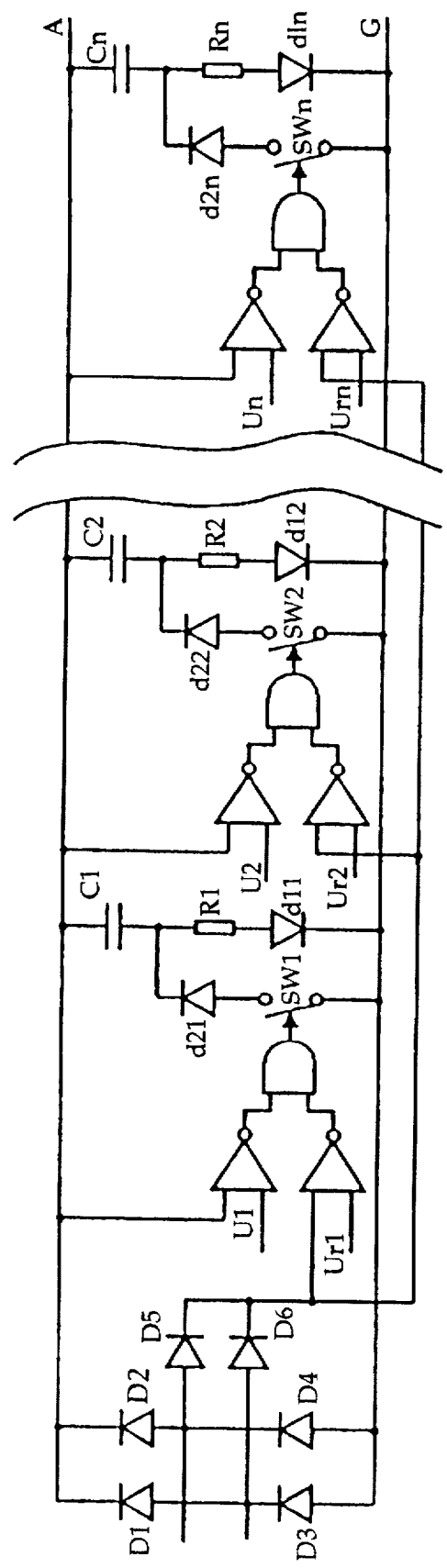

In the circuit of FIG. 9, the control circuit of each one of switches SWi is constituted by two comparators, with their outputs connected to an AND gate which controls the switch. The first switch has its first input connected to terminal A and its second input to a reference voltage Ui. The second comparator has its first terminal receiving the simple a.c. rectified voltage of the mains via diodes D5 and D6 and its second terminal, as previously, connected to a reference voltage Uri. Those skilled in the art will note that this simplifies the logic design of the system.

Figure 10:
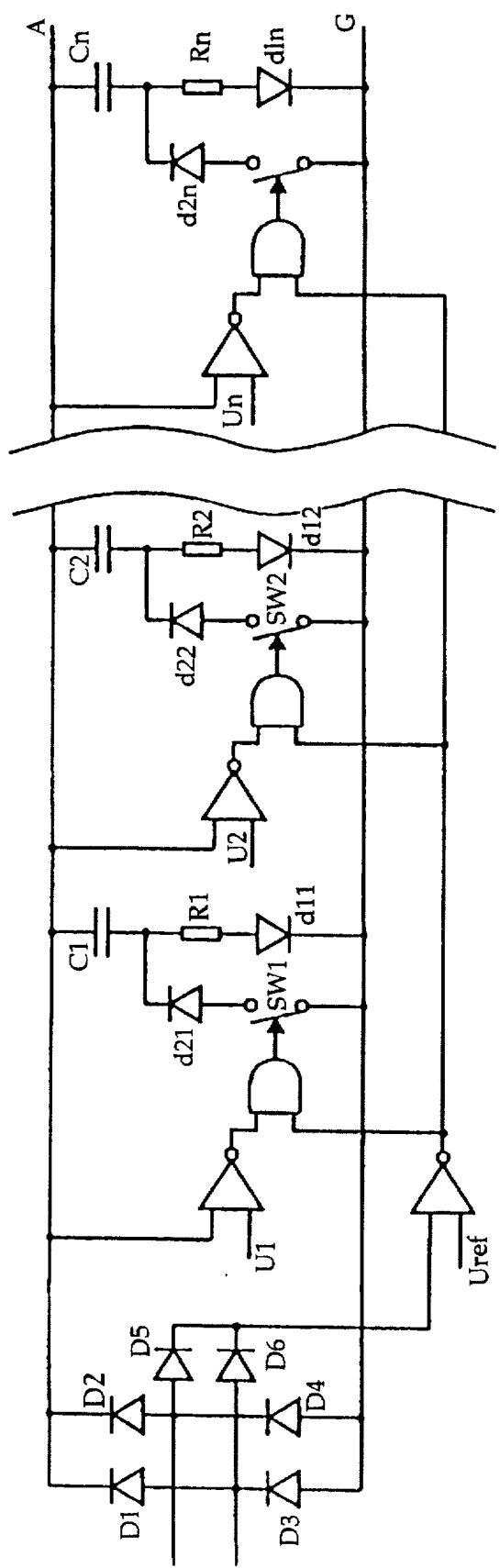

The schematic of FIG. 10 is identical to that of FIG. 9, except that all second comparators have their second input connected to a same reference voltage Uref. A single second comparator is thus sufficient.

Figure 11:
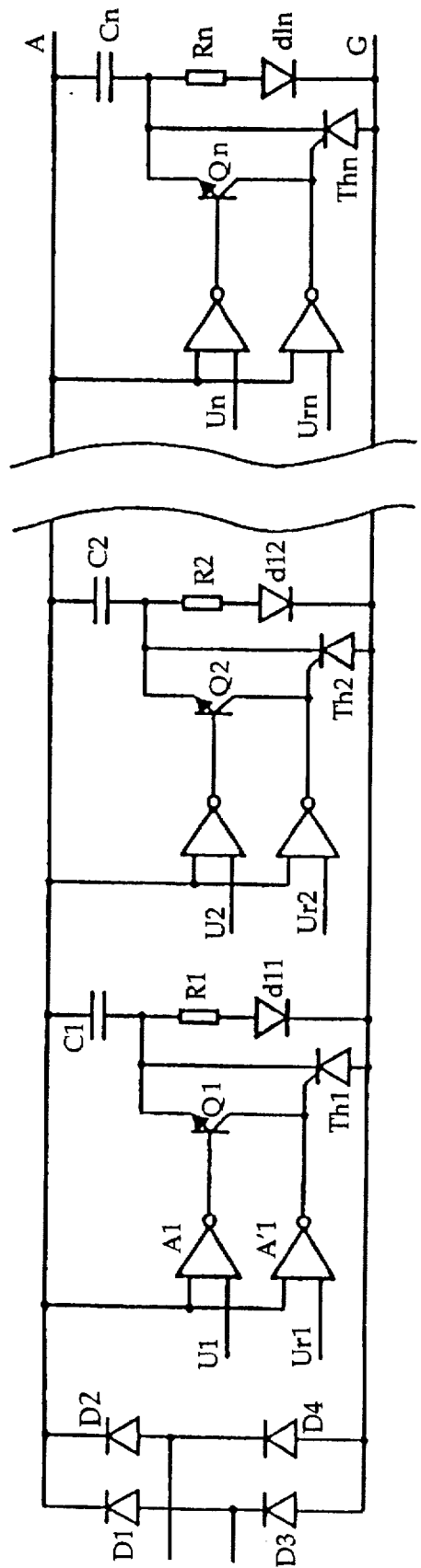

FIG. 11 shows a specific embodiment of the circuit of FIG. 7. This circuit includes n identical cells, with only the first one being described. The charge path of capacitor C1 always includes a resistor R1 and a diode d11. The discharge path of capacitor C1 includes a thyristor Th1, the anode of which is connected to terminal G and the cathode of which is connected to the junction of resistor R1 and capacitor C1. A transistor Q1, the base of which is connected to the output of a first comparator A1, is disposed in parallel between the gate and the cathode of thyristor Th1, while the gate of thyristor Th1 is also connected to the output of a second comparator A'1. The first inputs of comparators A1 and A'1 receive voltage VA and the second inputs of comparators A1 and A'1 respectively receive voltages U1 and Ur1. It should be noted that the operation of this circuit is effectively that described in conjunction with FIG. 7.

Figure 12:
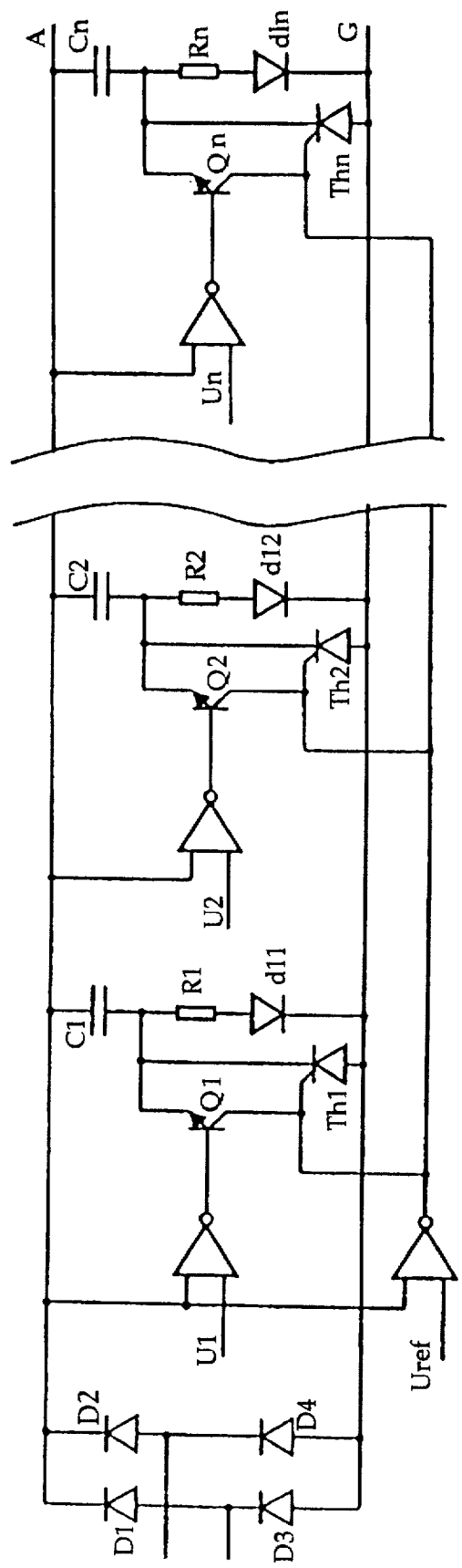

FIG. 12 shows the application of the specific circuit described in FIG. 11 to the embodiment of FIG. 8.

Of course, the present invention is likely to have many alterations and modifications which will appear to those skilled in the art. The major aspects of the present invention that may be modified include the following items:

reducing the steepness of the leading edge of the charge current of the storage capacitors by placing a resistor in series with these capacitors, inhibiting the discharge of the storage capacitors during the initial decrease phase of the supply voltage so as, during this phase, to keep on extracting current from the mains and thus to lengthen the duration of the current extracted from the mains, multiplying the number of cells to further broaden the charge current of the capacitors, the capacitors of the various cells having different charge time constants.

In a specific embodiment of the present invention, using only two cells and for a 230 volt RMS supply voltage, the following values have been chosen:

C1=15 microfarads,

C2=30 microfarads,

R1=20 ohms,

R2=100 ohms,

Ur1=Ur2=U1=230 volts,

U2=290 volts.

The curve illustrated in FIG. 6 has then been obtained for the current, the power factor being around 0.82 and the power consumption on the network, substantially added by resistors R1 and R2, was only 2.7% of the output.

Figure 13:
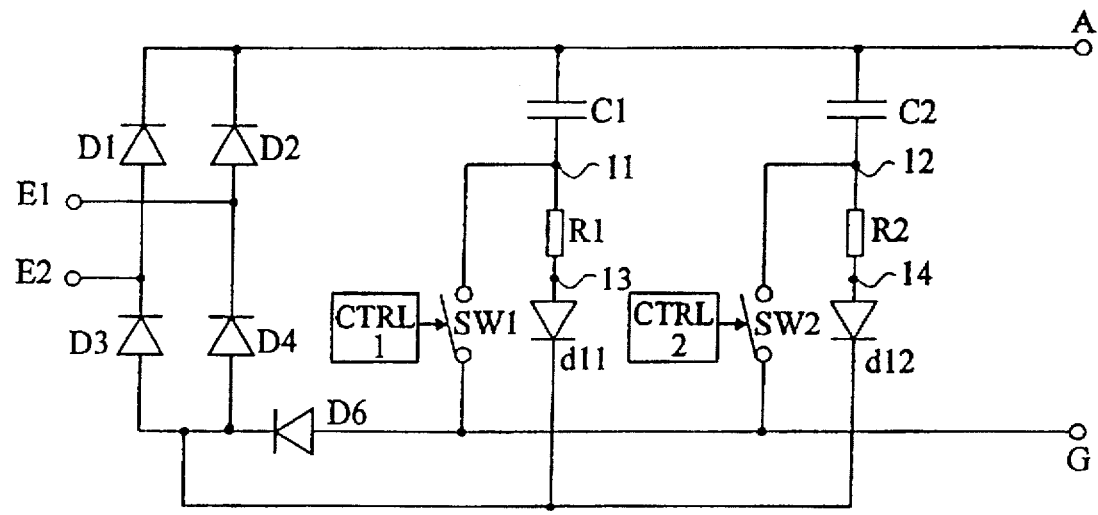
FIG. 13 shows an alternative two-stage circuit according to the present invention.

FIG. 13 and the following drawings relate to an alternative embodiment of the present invention adapted to sequentially controlling the capacitors in a multiple-stage device.

FIG. 13 shows a two-stage device wherein elements identical to those already described in conjunction with FIG. 5 are referred to by the same reference numbers.

In this device, the discharge paths of capacitors C1, C2, do not include individual isolating diodes d21, d22 but are connected, on the one hand directly to terminal G, on the other hand to the lower terminal of the rectifying bridge via a diode D6. This diode D6 avoids for the discharge of one capacitor to occur through the other capacitor. The charge paths are connected to the terminals of the rectifying bridge.

Switches SW1 and SW2 are controlled by control circuits CTRL1, CTRL2, so as never to be on simultaneously. More particularly, in the case where time constant R1*C1 is much higher than time constant R2*C2 (and preferably where C1 is higher than C2), switch SW1 will be first set to the "on" position with some delay with respect to the transiting of the mains voltage through a maximum voltage valve. Then, after a second delay, switch SW1 is set to the "off" position and switch SW2 is set to the "on" position.

The specific case where switch SW2 stays in the "on" position until the voltage across capacitor C2 becomes equal to the mains voltage will be considered. Thus, in this embodiment, no anticipated turn-off of the second capacitor is provided. Within the framework of the notations of FIG. 4A, this corresponds to providing thresholds Ur1 and Ur2 only and not thresholds U1 and U2. However, those skilled in the art could use this alteration. Moreover, although only two successive stages corresponding to capacitors C1 and C2 are described in conjunction with FIG. 13, the number of stages could, as formerly, be multiplied, with the capacitors with higher values being set to discharge before the capacitors with lower values.

Figure 14:
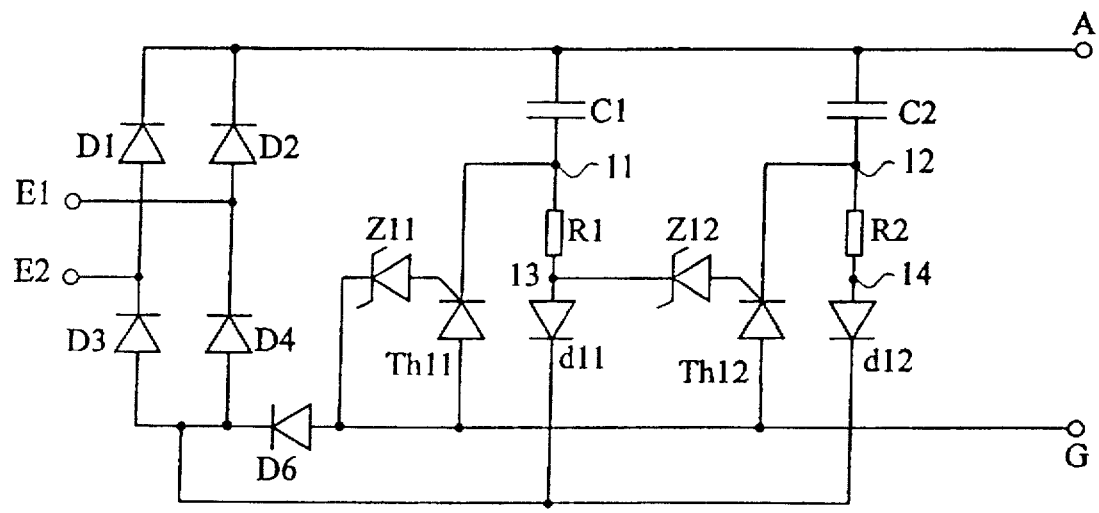
FIG. 14 shows an embodiment of the circuit of FIG. 13.

FIG. 14 shows an example of realization of switches SW1 and SW2 and their associated control circuits CTRL1 and CTRL2. Switches SW1 and SW2 are realized in the form of thyristors Th11 and Th12 connected between the second terminals 11, 12 of capacitors C1, C2 of terminal G. Thyristor Th11 is controlled by a Zener diode Z11 connected between the gate and the anode of the thyristor. Control device CTRL2 is realized in the form of a Zener diode Z12 connected between the gate of thyristor Th12 and the junction 13 of resistor R1 and diode d11. Should a longer chain of capacitors be used, the assembly of components C2, R2, d12, Th12 and Z12 would be reproduced, the Zener diode of the third stage being connected to the junction 14 of resistor R2 and diode d12, and so on.

Figure 15:
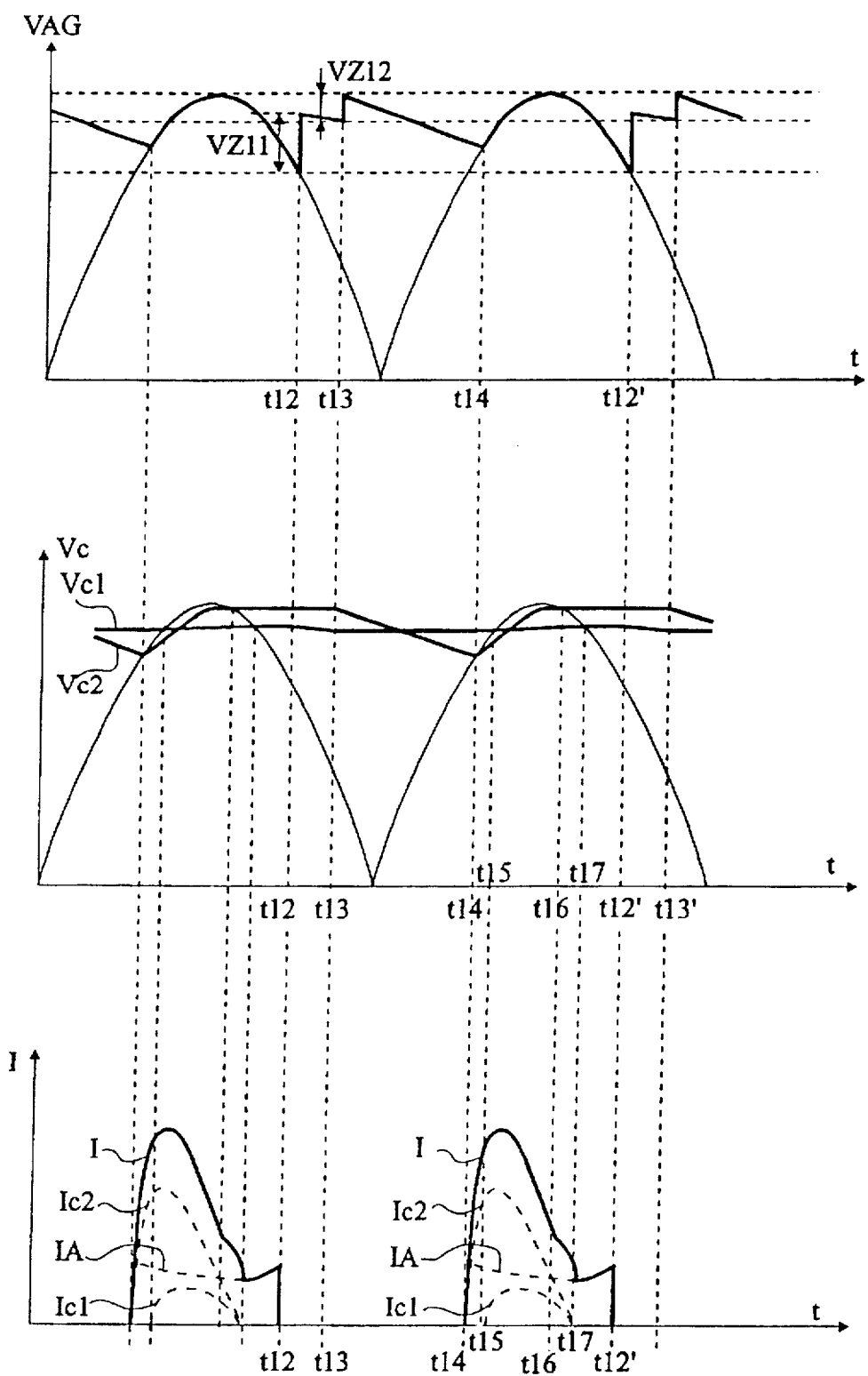
FIG. 15 shows voltage and current versus time curves illustrating the operation of the devices of FIGS. 13 and 14.

The operation of the circuit according to the alternative embodiment of FIGS. 13 and 14 will be explained in conjunction with FIG. 15 which shows, as a function of time, voltage VAG at the connection terminals; voltages VC1 and VC2 across capacitors C1 and C2; and the current I supplied by the mains.

At the initial time, the mains voltage is close to a maximum and switches SW1 and SW2 (thyristors Th11 and Th12) are in their "off" position. While the voltage on terminal A decreases, the voltage on the second terminal of capacitor C1 decreases (since the capacitor is neither charged nor discharged) and, when the mains voltage has dropped by substantially the Zener voltage VZ11 of diode Z11, a gate current flows through thyristor Th11 which turns on. From that time (time t12), the supply of terminals A and G comes from capacitor C1. This capacitor then slowly discharges. During this phase, capacitor C2 maintains its charge, that is, the voltage on its terminal 12 also progressively decreases.

At a time t13, the voltage on terminal 11 of capacitor C1 becomes higher than the voltage on terminal 12 of capacitor C2 by the value of the threshold voltage VZ12 of Zener diode Z12. Zener diode Z12 starts an avalanche and turns thyristor Th12 on. From that time, capacitor C2 ensures the supply between terminals A and G and the potential on terminal 11 of capacitor C1 rapidly increases through thyristor Th12 and direct diode Z12. Thus, the two terminals of thyristor Th11 are at the same potential and this thyristor enters a blocked state.

Capacitor C2 progressively discharges until, at a time t14, the mains voltage becomes higher than the voltage across the capacitor, at which time the mains takes over the supplying of voltage to terminals A and G and thyristor Th12 automatically blocks. Then, at a time t12', the situation of time t12 is repeated, and the mains ensures the power supply.

Let us now examine the shapes of the voltages across the capacitors in more detail, keeping in mind that the hypothesis of a time constant R1*C1 much higher than time constant R2*C2 and of, preferably, a value of C1 higher than the value of C2, has been chosen.

Between times t12 and t13, the high value capacitor C1 slightly discharges while the voltage across capacitor C2 remains constant. Between times t13 and t14, capacitor C2 discharges while the voltage across capacitor C1 remains constant (neither charge, nor discharge). From time t14, capacitor C2 starts to charge and capacitor C1 starts to charge at a slightly subsequent time t15 as soon as the mains voltage becomes higher than the voltage across the capacitor. Capacitor C2 keeps on charging until a time t16, slightly after the maximum of the mains voltage, at which time it is completely charged. As for capacitor C1, which charges very slowly, it only stops charging at a time t17 subsequent to time t16. From time t16 on, the charge of capacitor C2 remains constant and from time t17 on, the charge of capacitor C1 remains constant. Then, from time t12' on, the configuration found is that discussed in relation with time t12.

Thus, between times t14 and t12', the current I extracted from the mains corresponds to the superposition of three currents: a charge current IC2 of capacitor C2, a charge current IC1 of C1 and a charge supply current IA. As shown by the curves, this superposition allows an adequate widening of the current peak extracted from the sector.

This current peak could have been further widened by the provision of a preliminary phase corresponding to the phase following time t3 in FIG. 4C. Practically, the widening already obtained is found to be enough and it is not necessary to complexify the logic circuits to obtain a further widening. However, it will always be possible for those skilled in the art, in order to meet specific requirements, to provide a preliminary phase such as the phase following time $t_3$ in FIG. 4C.

As an example of numerical values, in the case where the mains has a peak voltage of around 300 volts, respective values of 70 and 40 volts can be chosen for the avalanche voltages of Zener diodes Z1 and Z2.

It should be noted that the voltages on the second terminals 11 and 12 of capacitors C1 and C2, at the junction 13 of resistor R1 and diode d11, and at the junction 14 of resistor R2 and diode d12, are voltages with peak values which are positive with respect to terminal G and low with respect to the voltage of terminal A.

Thus, according to an aspect of the present invention, one of these voltages or the other is used to supply a source of low d.c. voltage. This allows obtaining, from a single circuit, a high voltage and a low voltage in a predetermined ratio with respect to one another, without it being necessary to use a multiple-secondary transformer.

Figure 16:
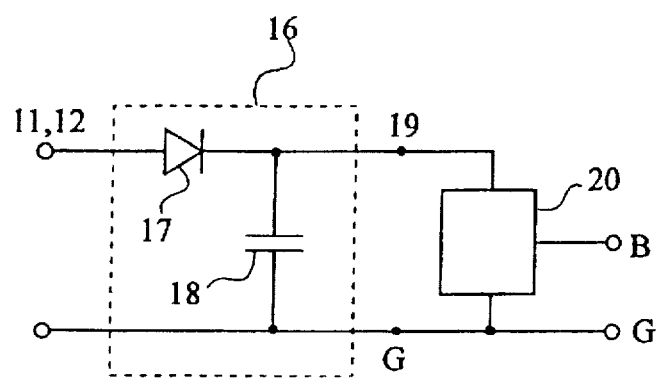
FIG. 16 illustrates a circuit for supplying a low voltage based on a high voltage supply circuit according to the present invention.

As shown in FIG. 16, the voltage on terminal 11 or 12 can be merely supplied to a peak rectifier 16 including, for example, a diode 17 in series and a capacitor 18 in parallel. A rectified voltage is thus available at the junction 19 of diode 17 and capacitor 18. This rectified voltage can be regulated by a series or parallel regulation device, for instance by a parallel regulation device 20 to supply a low value regulated voltage on a terminal B.

Figure 17:
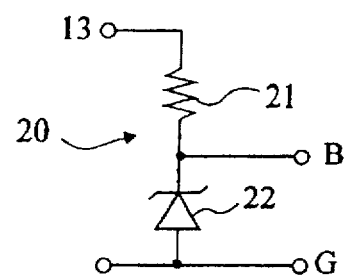
FIG. 17 shows an elementary example of a parallel regulator.

FIG. 17 shows an elementary example of a parallel regulator which can be used as a regulator 20. However, as it is known, such a regulator suffers from the drawback of power dissipation in resistor 21.

Figure 18:
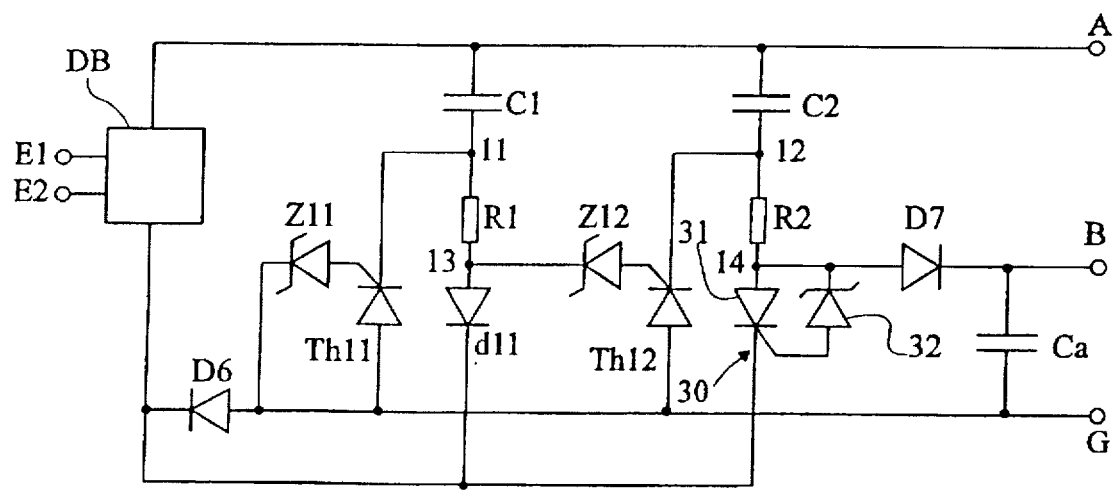
FIG. 18 shows an alternative circuit according to the present invention adapted to the simultaneous supplying of high and low voltages.

FIG. 18 shows an example of alteration of the circuit according to the present invention of FIG. 14, adapted to the simultaneous supply of high and low voltages, without causing over consumption by ohmic losses in order to obtain the low supply voltage.

FIG. 18 includes the same elements as FIG. 14 with the same reference numbers. Particularly, the first power storage stage including capacitor C1 is not altered. As for the second stage, the discharge path of capacitor C2 remains identical to that of FIG. 14. Yet, the charge path has been altered. It still includes resistor R2 between terminals 12 and 14. This time, however, terminal 14 is connected to terminal G via the series connection of a diode D7 and an auxiliary capacitor Ca. A voltage limiting component 30, of the Shockley diode type, including for example a thyristor 31 having its gate connected to the anode by a Zener diode 32, limits the voltage across the series connection of diode D7, capacitor Ca and diode D6.

In the circuit of FIG. 18, while capacitor C2 charges, capacitor Ca simultaneously charges at a voltage which substantially corresponds to the threshold voltage of Zener diode 32 (minus the direct voltage drops in diodes D6 and D7, plus the gate-cathode voltage drop of thyristor 31). A low voltage with respect to the voltage between terminals A and G is thus effectively obtained between terminals B and G. When capacitor Ca is completely charged, at the desired threshold, Zener diode 32 causes the turn-on of thyristor 31. Capacitor Ca cannot discharge into this thyristor, because of the presence of diode D7, and the charge of capacitor C2 continues and is reduced only by the slight voltage drop across thyristor 31 in the on-state. Thus, since the presence of auxiliary capacitor Ca constitutes an auxiliary voltage source, it does not cause further ohmic losses in the circuit.

Of course, the present invention is likely to have many alterations, modifications, and improvements which will appear to those skilled in the art, and the two following features should particularly be noted:

simultaneous supply of a high value voltage source and of a low value voltage source, realization of the low value voltage source without ohmic consumption.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A device for reducing harmonics sent back onto a mains network by a rectified power supply, the device including:
    a rectifying bridge having first and second output terminals,
    a plurality of capacitors having respectively progressively increasing values and respectively progressively increasing charge time constants, and first associated successively increasing reference voltages, each capacitor having a first terminal connected to the first output terminal of the rectifying bridge and a second terminal,
    wherein each capacitor is connected to a first charge path including a resistor, connected between the second terminal of said respective capacitor and the second output terminal, and a switchable discharge path, connected to the second terminal of said respective capacitor including control means to switch on the switchable discharge path only after a rectified supply voltage has transited through a predetermined maximum voltage.

2. The device according to claim 1, wherein the control means compare a voltage on the first terminal of the respective capacitor to first and second reference voltages.

3. The device according to claim 1, wherein the control means compare the rectified supply voltage to first and second reference voltages.

4. The device according to claim 2 or 3, wherein the first and second reference voltages are equal to one another.

5. The device according to claim 1, wherein each respective charge path includes a resistor in series with a diode.

6. The device according to claim 1, wherein each respective charge path includes a charge diode connected at a junction to the resistor, and each respective discharge path includes a respective switch connected to the second terminal of the respective capacitor and to the second output terminal of the rectifying bridge via a common diode.

7. The device according to claim 6, wherein the respective switch of each discharge path is constituted by a thyristor having its gate connected in series to a first terminal of a Zener diode having its second terminal connected, for a first stage, to the anode of the corresponding thyristor and, for an other stage, to the junction of the resistor and of the charge diode of a preceding stage.

8. The device according to claim 7, further including means for supplying a second rectified supply voltage, which is low with respect to the first rectified supply voltage and substantially corresponds to the voltage on the second terminal of one of the capacitors.

9. The device according to claim 8, wherein the voltage on said second terminal of one of the capacitors is supplied to a storage circuit including an auxiliary diode in series with an auxiliary capacitor.

10. The device according to claim 9, further including means for regulating a voltage across the auxiliary capacitor.

11. The device according to claim 9, wherein the regulating means include a Shockley-type diode connected across the series connection of said auxiliary diode and said auxiliary capacitor.

12. A method for supplying a rectified supply voltage on at least one capacitor of a plurality of capacitors disposed on a rectified side of a rectifying bridge, the method including steps of:
    providing the plurality of capacitors with respective progressively decreasing values, each capacitor in series with a respective resistor of a plurality of resistors, the plurality of resistors having progressively decreasing values;
    applying an alternating current voltage to the rectifying bridge;
    inhibiting a discharge of said each capacitor of the plurality of capacitors during an initial decreasing phase of the alternating current voltage applied to the rectifying bridge after each occurrence of a predetermined maximum voltage on said each capacitor;
    when said each capacitor enters a discharge phase, blocking a previously discharging capacitor from discharging.

13. The method as recited in claim 12, wherein the step of inhibiting the discharge of said each capacitor includes a step of:
    charging said each capacitor while the voltage on said each capacitor is less than a first reference level.

14. The method as recited in claim 13, further comprising a step of:
    discharging said each capacitor when the rectified supply voltage is less than a second reference level.

15. The method as recited in claim 14, wherein the step of discharging said each capacitor includes a step of:
    discharging said each capacitor to ground through a respective circuit including a diode and a switch.

16. The method as recited in claim 15, further comprising a step of:
    operating each respective switch such that no two capacitors of the plurality of capacitors discharge at a same time.

17. A power supply comprising:
    a rectifying bridge having first and second input terminals to receive an alternating current voltage and first and second output terminals to provide a rectified voltage;
    a first output capacitor having first and second terminals with the first terminal of the first output capacitor connected to the first output terminal;
    a second output capacitor having first and second terminals with the first terminal of the second output capacitor connected to the first output terminal;

a first stage connected to the first and second output terminals and the second terminal of the first output capacitor;

a second stage connected to the first and second output terminals and the second terminal of the second output capacitor;

wherein, the first and second stages each comprises:

a charge circuit connected between the second terminal of the respective output capacitor and the second output terminal; and a discharge circuit, connected between the second terminal of the respective output capacitor and the second output terminal, including a discharge switching circuit to operate the discharge circuit when the rectified voltage has reached a predetermined voltage; and wherein the second output capacitor has a larger value than a value of the first output capacitor.

18. The power supply as recited in claim 17, wherein each charge circuit comprises:

a charge resistor and a charge diode connected in series between the second terminal of the respective output capacitor and the second output terminal, the charge diode biased to allow current to flow from the first output terminal to the second output terminal; and each discharge circuit comprises:

a discharge diode and a discharge switch connected in series between the second terminal of the respective output capacitor and the second output terminal, the discharge diode biased to allow current to flow from the second output terminal to the first output terminal, the discharge switch to be controlled by the discharge switching circuit.

19. The power supply as recited in claim 18, wherein:

a resistance value of the charge resistor in the first stage is less than a resistance value of the charge resistor in the second stage.

20. The power supply as recited in claim 18, wherein each discharge switching circuit comprises:

an RS flip-flop having first and second input terminals and an output terminal coupled to the discharge switch;

a first inverting comparator having first and second input terminals and an output terminal connected to the first input terminal of the RS flip-flop, the first input terminal connected to the first output terminal of the rectifying bridge, the second input terminal of the first inverting comparator to receive a first reference voltage;

a second inverting comparator having first and second input terminals and an output terminal connected to the second input terminal of the RS flip-flop, the first input terminal connected to the first output terminal of the rectifying bridge, the second input terminal of the second inverting comparator to receive a second reference voltage.

21. The power supply as recited in claim 18, further comprising:

a first inverting comparator having first and second input terminals and an output terminal, the first input terminal connected to the first output terminal and the second input terminal to receive a first reference voltage;

wherein each discharge switching circuit comprises:

an RS flip-flop having first and second input terminals and an output terminal, the output terminal coupled to the discharge switch;

a stage inverting comparator having first and second input terminals and an output terminal, the first input terminal connected to the first output terminal of the rectifying bridge, the second input terminal to receive a second reference voltage and the output terminal connected to the first input terminal of the RS flip-flop; and wherein, the second input terminal of each RS flip-flop in each discharge switching circuit is connected to the output of the first inverting comparator.

22. The power supply as recited in claim 18, wherein each discharge switching circuit comprises:

means for opening the discharge switch when the rectified voltage is less than a first reference voltage; and means for closing the discharge switch when the rectified voltage is less than a second reference voltage.

23. The power supply as recited in claim 22, wherein the first reference voltage is greater than the second reference voltage.

24. The power supply as recited in claim 22, wherein the first reference voltage is equal to the second reference voltage.

25. A power factor compensation device for use with a rectifying power supply having first and second output terminals, the compensation device comprising:

a first output capacitor connected to the first output terminal;

a second output capacitor connected to the first output terminal;

a first stage connected in series between the first output capacitor and the second output terminal;

a second stage connected in series between the second output capacitor and the second output terminal;

wherein, each of the first and second stages comprises:

a charge circuit connected in series between the respective output capacitor and the second output terminal; and a discharge circuit connected in series between the respective output capacitor and the second output terminal to discharge a voltage on the respective output capacitor when a voltage on the first output terminal has reached a predetermined voltage;

wherein the second output capacitor has a larger value than a value of the first output capacitor.

26. The power supply as recited in claim 25, wherein each charge circuit comprises:

a charge resistor and a charge diode connected in series between the second terminal of the respective output capacitor and the second output terminal, the charge diode biased to allow current to flow from the first output terminal to the second output terminal; and each discharge circuit comprises:

a discharge diode and a discharge switch connected in series between the second terminal of the respective output capacitor and the second output terminal, the discharge diode biased to allow current to flow from the second output terminal to the first output terminal, the discharge switch to be controlled by the discharge switching circuit.

27. The power supply as recited in claim 26, wherein:

a resistance value of the charge resistor in the first stage is less than a resistance value of the charge resistor in the second stage.

28. The power supply as recited in claim 26, wherein each discharge switching circuit comprises:

means for opening the discharge switch when the rectified voltage is less than a first reference voltage; and means for closing the discharge switch when the rectified voltage is less than a second reference voltage.

29. A method of reducing harmonics sent back onto a main alternating current network by a power supply including a rectifying bridge receiving an alternating current voltage from the main alternating current network and outputting a rectified output voltage across first and second rectifier output terminals, the method comprising steps of:

(a) coupling a first terminal of a first capacitor to the first rectifier output;

(b) coupling a first terminal of a second capacitor to the first rectifier output;

(c) charging the first capacitor while the rectified output voltage is at least a first reference level;

(d) discharging a voltage on the first capacitor onto the first rectifier output terminal when the rectified output voltage is less than a second reference level;

(e) stopping the discharging of the first capacitor when the rectified output voltage is less than the first reference level;

(f) charging the second capacitor while the rectified output voltage is at least a third reference level;

(g) discharging a voltage on the second capacitor onto the first rectifier output terminal when the rectified output voltage is less than a fourth reference level;

(h) stopping the discharging of the second capacitor when the rectified voltage is less than the third reference level;

(i) providing the first capacitor with a smaller value than the second capacitor; and (j) setting the first, second, third and fourth reference levels such that the first and second capacitors discharges sequentially without overlapping.

30. The method as recited in claim 29, wherein step (d) includes a step of:

coupling a second terminal of the first capacitor to the second rectifier output terminal via a diode biases to allow current to flow from the first rectifier output terminal to the second rectifier output terminal.

31. The method as recited in claim 30, further comprising steps of:

providing a switching device in series between the diode and the second rectifier output terminal; and operating the switching device so as to connect the diode to the second rectifier output terminal thereby discharging the first capacitor.

32. The method as recited in claim 29, wherein step (g) includes a step of:

coupling a second terminal of the second capacitor to the second rectifier output terminal via a diode biased to allow current to flow from the first rectifier output terminal to the second rectifier output terminal.

33. The method as recited in claim 32, further comprising steps of:

providing a switching device in series between the diode and the second rectifier output terminal; and operating the switching device so as to connect the diode to the second rectifier output terminal thereby discharging the second capacitor.

* * * * *

UNITED STATES PATENT AND TRADEMARK OFFICE
CERTIFICATE OF CORRECTION

PATENT NO. : 5,798,914
DATED : August 25, 1998
INVENTOR(S): Luc WUIDART and Alain BAILLY It is certified that error appears in the above-identified patent and that said Letters Patent is hereby corrected as shown below:

Please change column 1, line 52 to read:

Microelectronics under reference number L6560, provides a

Please change the time constant in column 5, line 21 to read: **R1*C1**

Please delete the word "for" from column 6, line 46.

Signed and Sealed this

Twenty-fourth Day of November, 1998

Attest:

BRUCE LEHMAN

Attesting Officer

Commissioner of Patents and Trademarks